United States Patent [19]

Kelch

[11] Patent Number: 4,763,684

[45] Date of Patent: Aug. 16, 1988

[54] GAS SEPARATION VALVE ASSEMBLY FOR A DIESEL MOTOR SYSTEM EQUIPPED FOR MEASURING FUEL CONSUMPTION

[75] Inventor: Heinz Kelch, Koenigsfeld, Fed. Rep. of Germany

[73] Assignee: Mannesmann Kienzle GmbH, Villingen-Schwenningen, Fed. Rep. of Germany

[21] Appl. No.: 38,146

[22] Filed: Apr. 14, 1987

Related U.S. Application Data

[63] Continuation-in-part of Ser. No. 847,207, Apr. 2, 1986, Pat. No. 4,724,860.

[30] Foreign Application Priority Data

Apr. 3, 1985 [DE] Fed. Rep. of Germany ........ 3512191

[51] Int. Cl.[4] ............................................. F16K 31/20
[52] U.S. Cl. ..................................... 137/196; 123/514; 123/516; 137/192
[58] Field of Search ................ 123/514, 516; 137/192, 137/193, 194, 195, 196

[56] References Cited

U.S. PATENT DOCUMENTS 1,334,079 3/1920 Callicott ............................... 137/193
4,306,580 12/1981 Wallquist et al. ................... 137/192

FOREIGN PATENT DOCUMENTS 19026 of 1889 United Kingdom ................ 137/194

*Primary Examiner*—Gerald A. Michalsky
*Attorney, Agent, or Firm*—Toren, McGeady & Associates

[57] ABSTRACT

A gas separation valve assembly for a diesel motor system having a tank with a float therein controlling a valve mechanism through which fuel is dispensed from the tank. A dual sleeve assembly is arranged within the tank having an inner sleeve with a lower end in fluid-tight connection with the tank and an outer sleeve arranged to define an annular space between itself and the outer wall of the tank and an intermediate space between itself and the inner sleeve. Fuel is introduced into the tank through an aperture so as to flow into the annular space between the tank wall and the outer sleeve and then to pass through the intermediate space so as to overflow the inner wall and to flow into an interior space of the tank within which the float is located.

10 Claims, 4 Drawing Sheets

GAS SEPARATION VALVE ASSEMBLY FOR A DIESEL MOTOR SYSTEM EQUIPPED FOR MEASURING FUEL CONSUMPTION

The present invention is a continuation-in-part of application Ser. No. 847,207 filed April 2, 1986, U.S. Pat. No. 4,724,860.

The present invention is directed to diesel motor control equipment and more particularly to a gas separation valve assembly adapted for use in the operational system of such a diesel motor which is equipped for measurement of fuel consumption.

The arrangement of the type to which the present invention relates consists of a tank which is equipped with an aperture for gas exchange and which comprises a float and a valve in a base support plate of the tank with the valve being controlled by the float. The valve operates to control admission of excess fuel quantity flowing back from an injection pump of the diesel motor system through an additional aperture back into the tank in the operating system of the diesel motor.

In an operating system of a diesel motor, excess fuel is normally placed into the circulation cycle of the fuel pump and this excess is greater than the injection pump of the system can utilize, as is well known. Relatively large excess fuel quantity returning to the fuel reservoir of the system serves for cooling and, at the same time, it fulfills a purging function as far as gas bubble accumulation in the injection pump is concerned.

If fuel consumption is to be measured in such an operational system, this then can be accomplished either by differential measurement, by placing a flow meter into the circuit upstream and downstream of the injection pump or it can be accomplished in that a fuel circulation cycle designated as the injection circuit is constituted by return of the excess fuel quantity into the suction line between the fuel pump and the fuel reservoir, with a flow meter being provided only between the feed point of the excess fuel quantity and the fuel reservoir.

Both of the aforementioned approaches result in adulteration of the measured results when the returning excess fuel contains a high percentage of gaseous content which, depending on the injection process, is particularly noticeable, for example, in a Cummins motor or when using distributor injection pumps. Since degassing of the returning fuel in such an operational system of a diesel engine can no longer occur in the fuel reservoir, it is imperative to provide an additional tank for gas separation. Here it is proposed, in the case of feeding excess fuel quantity into the suction line, to provide in this tank and preferably in its base area, a valve connecting, for example, the tank space and the suction line. The valve and thus the feed of the excess fuel quantity into the injection circuit or the ensuing aspiration of the fuel from the fuel reservoir may be controlled by means of a float located within the tank.

Of course, it is desirable to minimize the expense for such an auxiliary device required for fuel consumption measurement and it is also above all desirable to reduce the structural volume of this additional tank as much as possible in view of the expected installation problems. On the other hand, a contrary requirement arises particularly in view of the direct correlation of the suction line and gas separating tank, whereby gas separation must occur with a relatively high efficiency and wherein the additional complication arises that the returning excess fuel quantity contain a gaseous proportion of up to 15% which is present partially in a foaming phase. Apart from that, in the existing operational conditions, the return flow often has a surge-like nature so that calming and rapid degassing of the fuel flowing into the tank is delayed.

A gas separation tank known in the prior art from DE-PS No. 29 32 014 has an inside space which is subdivided by a partially conical, partially cylindrical sleeve into an outer space into which the return float discharges and an inner space in which are located the float and the valve assigned thereto. This sleeve consists of a tissue with the task of filtering out gas bubbles. Actual practice has shown, however, that the incoming fuel does not distribute itself within the required manner over a large surface and that the gas finely distributed or dissolved in the fuel penetrates through the tissue and thus will be present in the float space in the vicinity of the valve. Since it is additionally necessary in actual practice to support the tissue sleeve in a suitable manner, for which purpose, the screen-like metal sheet is provided, additional turbulence arises when the fuel flows passed the hole edges and this turbulence results in bubble formation. The same applies to the considerably varying tank level during operation of the motor vehicle so that a relatively high tank must be selected.

SUMMARY OF THE INVENTION

The present invention is therefore directed toward providing an arrangement for gas separation adapted to the rough operating conditions existing in the fuel circulation cycle of a diesel motor, and particularly an arrangement which can be manufactured with low manufacturing and installation expenses and which will permit the provision of a relatively small tank with a reliable functional process.

Briefly, the present invention may be defined as a gas separation valve assembly in the operational system of a diesel motor equipped for fuel consumption measurement which includes an injection pump, said assembly comprising a tank having an outer wall and including an aperture for receiving excess fuel flowing back to the tank from the injection pump, float means located within the interior space defined within the tank and valve means responsive to the float means for controlling the flow from the interior space out of the tank.

The invention is particularly characterized by the dual valve assembly which is arranged within the tank essentially concentrically with the central axis thereof and which surrounds the interior space of the tank. The dual sleeve assembly includes an inner sleeve having a lower end in fluid-tight connection with the tank and an outer sleeve arranged to define an annular space between itself and the outer wall of the tank and an intermediate space between itself and the inner sleeve. The excess fuel receiving aperture of the tank is arranged to deliver the fuel flowing therethrough into the annular space and means are provided for effecting a lower fluid flow connection between the annular space and the intermediate space and a higher or upper fluid flow connection between the intermediate space and the interior space, the upper fluid flow connection being at an elevation higher than the lower fluid flow connection.

Accordingly, in accordance with the present invention, there is basically provided a sleeve assembly within the tank which is formed with at least two sleeves, with the inner sleeve being connected with a base support plate of the tank in an essentially liquid impermeable manner and with the aperture for the excess fuel quantity returning into the tank being directed so that incoming fuel flows into the space constituted by the outer sleeve and the outer wall of the tank with the space constituted by the outer sleeve and the outer wall of the tank being in fluid connection at the base support plate of the tank. The space enclosed by the inner sleeve has the float located therein and is in fluid connection at a higher level with the intermediate space defined between the two sleeves.

In a preferred embodiment of the invention, the outer sleeve and a baffle cupola are designed as an integral member and the inner sleeve is adapted to be connected with the outer sleeve by means of a plug-in connection with at least one pressure spring acting in the axial direction and arranged between the cover of the tank and the baffle cupola being provided.

As a result of the present invention, an optimal degassing process is achieved as well as a lessening of the turbulence of the fuel flowing back, particularly by distribution over as large a surface as possible. In other words, this occurs by a capturing process over as large a surface of the walls as possible. Apart from that, the arrangement of the invention provides a relatively long flow path by the redirection of the fuel in a cascading fashion, but also an extensive "thinning out" of the fuel flow.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described the preferred embodiments of the invention.

DETAILED DESCRIPTION OF THE PREFERRED EMBODIMENTS

Figure 1:
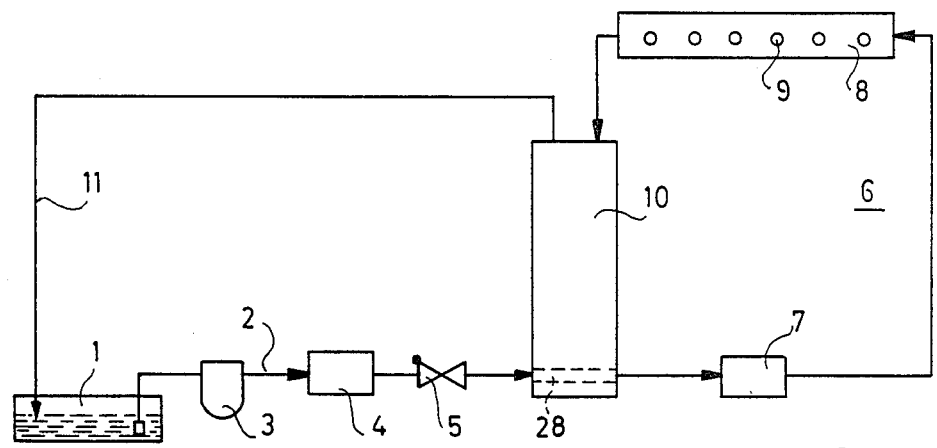
FIG. 1 is a schematic illustration of an injection circuit of a diesel motor operating system having a flow meter inserted in a suction line thereof.

Referring now to the drawings and particularly to FIG. 1, there is shown an operational system for a diesel motor which includes a fuel reservoir 1, a suction line 2 leading from the reservoir 1 with a filter 3 being provided in the suction line 2 together with a float meter 4 and a check valve 5. The system includes an injection circuit 6 within which a specific quantity of excess fuel is maintained in circulation. The quantity of excess fuel is usually relatively large as compared with the quantity of injection fuel which is consumed, and the flow occurs from a fuel pump 7 through an injection pump 8 including injection nozzles 9 and a tank 10 which operates as a gas separation mechanism. A gas line 11 connects the fuel reservoir 1 with the gas separation tank 10.

Figure 2:
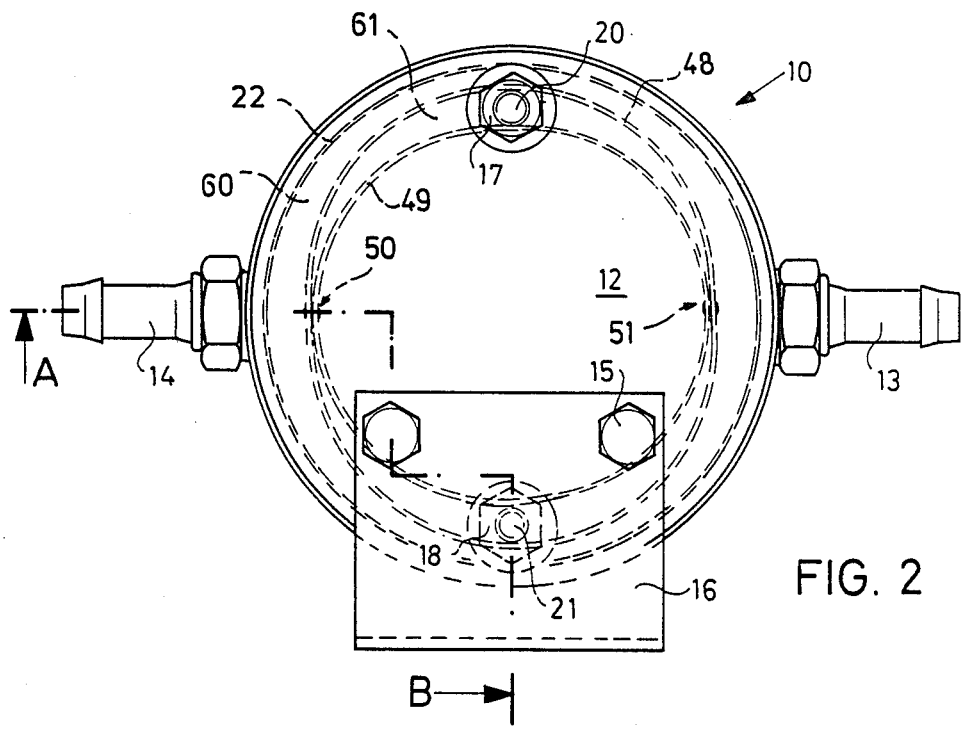
FIG. 2 is a plan view of a tank assembly operating as a gas separator according to the invention.
Figure 3:
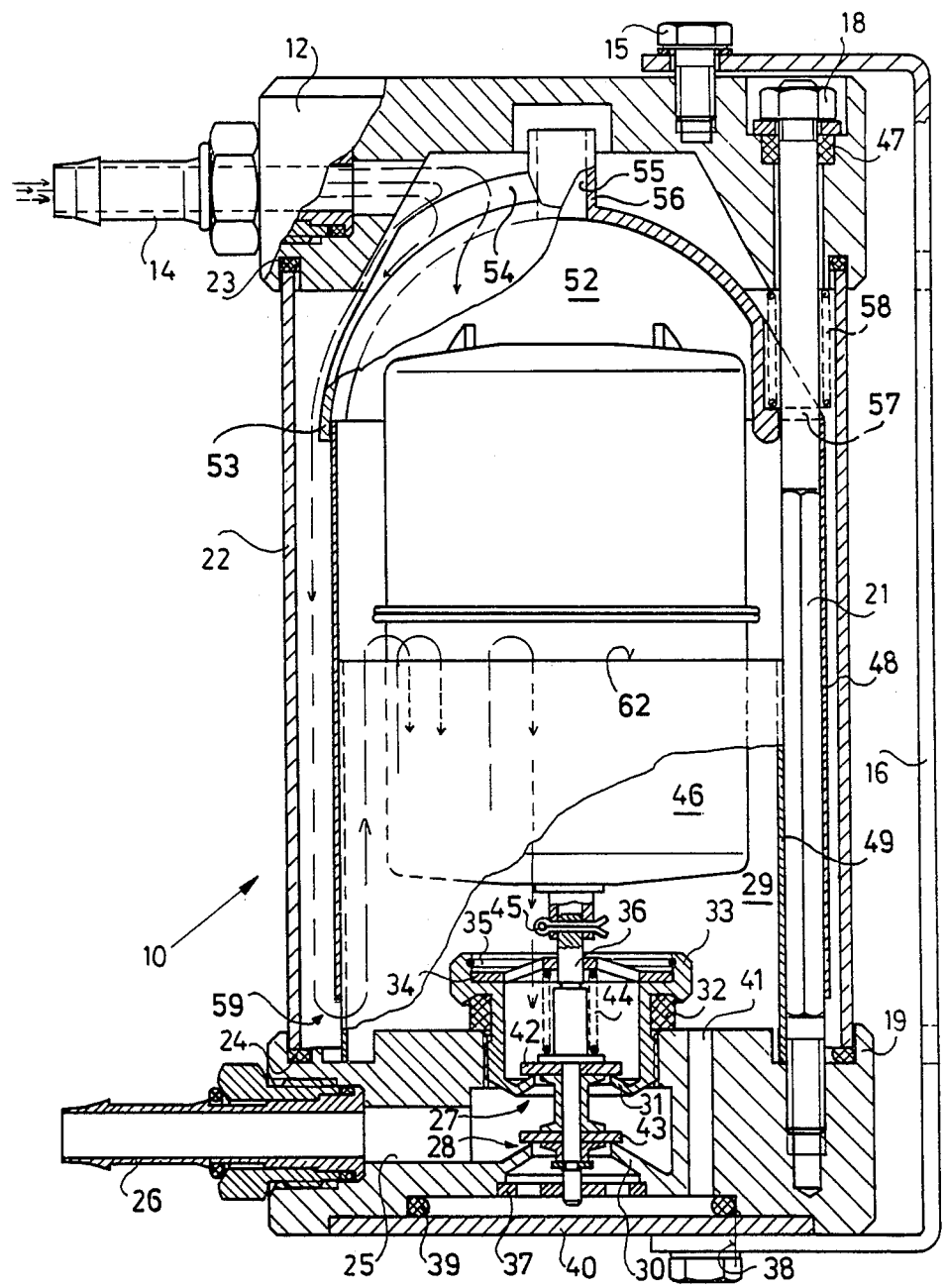
FIG. 3 is a longitudinal sectional view of the tank of FIG. 2 taken along the line A–B in FIG. 2.

The present invention is particularly directed to the structure and arrangement of the gas separation tank 10 and a first embodiment of the invention is shown in greater detail in FIGS. 2 and 3. The gas separation tank 10 is formed with an essentially cylindrical configuration which includes a cover member 12 at which hose connection means 13 and 14 are provided. The hose connection means are arranged for providing a connection for the return flow branch of the injection circuit 6 emanating from the injection pump 8 and for connecting the gas line 11. Thus, it may be assumed that the hose connection 14 provides inflow into the tank 10 from the injection pump 8 and that the hose connection 13 provides a connection with the gas line 11. The hose connection 14 may be considered as providing an aperture for gas exchange.

A fixture 16 is provided on the tank 10 which is attached by means of screws 15, the fixture operating to allow the tank 10 to be installed at a suitable location in the motor compartment of a vehicle. Nuts 17 and 18 are provided in the cover 12 for fastening the cover 12 to supports 20 and 21 fastened in a base support plate 19 of the tank 10.

The sectional view depicted in FIG. 3 shows that the tank 10 apart from the cover 12 and the base support plate 19 consists of an outer sleeve or wall 22 which is retained between the cover 12 and the base support plate 19 by the interposition of seals 23 and 24. A channel 25 extends transversely to a vertical axis of the tank 10 and is provided in the base support plate 19. The channel 25 is positionable by means of hose connections, one of which is the illustrated hose connection 26, between the suction line 2 and the injection circuit 6. The channel 25 is in flow communication with two apertures 27 and 28 spaced apart in the direction of the vertical axis of the tank 10 which connect the channel 25 in a fluid flow connection with an interior space 29 of the tank 10.

The aperture 28 is defined by a member which defines a first valve seat 30 and the aperture 27 is defined by a second valve seat member 31.

The valve seat member 31 is formed as an integral part of a hollow threaded member 33 which is insertable into the base plate 19 together with an interposed seal member 32. For the sake of completeness, it should be noted that the hollow threaded member 33 is provided with a knurled collar (not shown) serving for receiving a support member 34 provided with apertures (not shown) with the support member 34 being retained in the hollow threaded member 33 by means of a spring washer 35, with the support member 34 providing one support point for a valve rod or stem 36.

A second support point for the valve rod 36 is provided by a support plate 37, also having apertures extending therethrough, which is inserted in a relief area 38 located on the rear side of the aperture 28 or of the valve seat 30 defining the aperture 28.

The relief area 38 constitutes a chamber together with a cover fastened in a liquid sealing manner by a seal 39 at the base support plate 19, this chamber being connected with the interior space 29 by means of several channels, one of such channels 41 being shown in FIG. 3.

FIG. 3 furthermore shows that a pair of valve disk members 42 and 43 are arranged on the valve rod 36 and that the valve rod 36 is under the influence of a pressure spring 44 arranged in the hollow threaded member 33, with the valve rod being connected in an articulated manner by a cotter pin 45 with a float 46 which, as shown in FIG. 3, is formed to extensively occupy interior space 29 of the tank 10. A pair of seals including a seal 47 are assigned to the supports 20 and 21. The pressure spring 44 which is dimensioned so as to be relatively soft serves essentially to provide the float controlled double valve which, in the application of a motor vehicle, is exposed to considerable shock with a certain basic load. The float controlled double valve serves in the embodiment described for unpressurized supply of excess fuel into the channel 25 and thus into the suction line 2. The actual arrangement for gas separation is constituted by two relatively thin-walled and deformable sleeves 48 and 49 which, as shown in FIG. 2, are connected with each other at connection points 50 and 51 at outer contour lines lying opposite each other so that, during their installation, only one sleeve, in this case, double walled, needs to be handled.

Thus, it will be seen particularly with reference to FIGS. 2 and 3 that one of the principal elements of the invention is a dual sleeve assembly which is constituted by the two sleeves 48 and 49 which, with particular reference to FIG. 2, define therebetween two intermediate spaces - one of which is identified by reference numeral 61 - with the outer sleeve 48 defining an annular space 60 between an outer sleeve 22 of the tank assembly and the outer sleeve 48 of the dual sleeve assembly 48 / 49.

Located within the tank 10 is a baffle cupola 52 which is arranged in cooperative relationship with the dual sleeve assembly 48 / 49. The dual sleeve assembly 48 / 49 is fixed in position by means of a pair of supports 20, 21 which extend between the base support plate 19 and the cover 12 with the supports 20, 21 also supporting the dual sleeve assembly 48 / 49.

The baffle cupola 52 has an overlapping edge 53 engaging about the dual sleeve assembly 48 / 49 for centering or retention of the assembly within the tank 10. It will be noted from the drawings that the dual sleeve assembly 48 / 49 is generally centrally located to extend concentrically about the longitudinal central axis of the tank 10.

In the area immediately following the inflow aperture, there is provided a fin 54 located on the baffle cupola 52. Furthermore, the baffle cupola 52 is provided with a stub 56 defining an aperture 55 assigned to the interior space 29 of the tank 10 and also with two consoles, one of which is identified by reference numeral 57 in FIG. 3. Pressure springs 58 guided by the supports 20, 21 which abut between the cover 12 and the consoles 57 of the cupola 52 operate to provide an effect in that the sleeve 49 which is axially offset with respect to the outer sleever 48 rests upon the support plate 19 with its end face which constitutes, therefore, an adequate liquid sealing connection with the base support plate 19 of the tank 10. Thus, it will therefore be seen that the inner sleeve 49 is thereby placed at its lower end in fluid-tight connection with the tank through its liquid sealing engagement with the support plate 19.

As will be evident from FIG. 3, at the base of the dual sleeve assembly 48/ 49, there is provided a fluid flow connection 59 between the annular space 60 surrounding the sleeve 48 and the intermediate spaces 61 defined between the two sleeves 48 and 49. From FIG. 2, it will be seen that the annular space 61 is divided into two sickle-shaped parts above and below the connections 50, 51.

The fluid flowing back from the injection pump 8 which may, for example, flow into the tank 10 through the hose connection 14, as shown by the arrows in FIG. 3, initially impinges upon the baffle cupola 52. The fin 54 operates to avoid splashing and thus additional gas inclusion and also causes extensive distribution of the fuel across the baffle cupola 52. The baffle cupola 52 is preferably made of a material which has as high an adhesion as possible for diesel fuel. The fuel flowing away from the baffle cupola 52 initially flows downwardly externally of the outer sleeve 48 through the annular space 60. It then flows through the fluid connection 59 into the intermediate space 61 and again rises therein until it overflows an edge 62 of the inner sleeve 49. After overflowing the upper edge 62 of the inner sleeve 49, the fluid then discharges into the interior space 29 of the tank 10 within which the float 46 is located.

Figure 4:
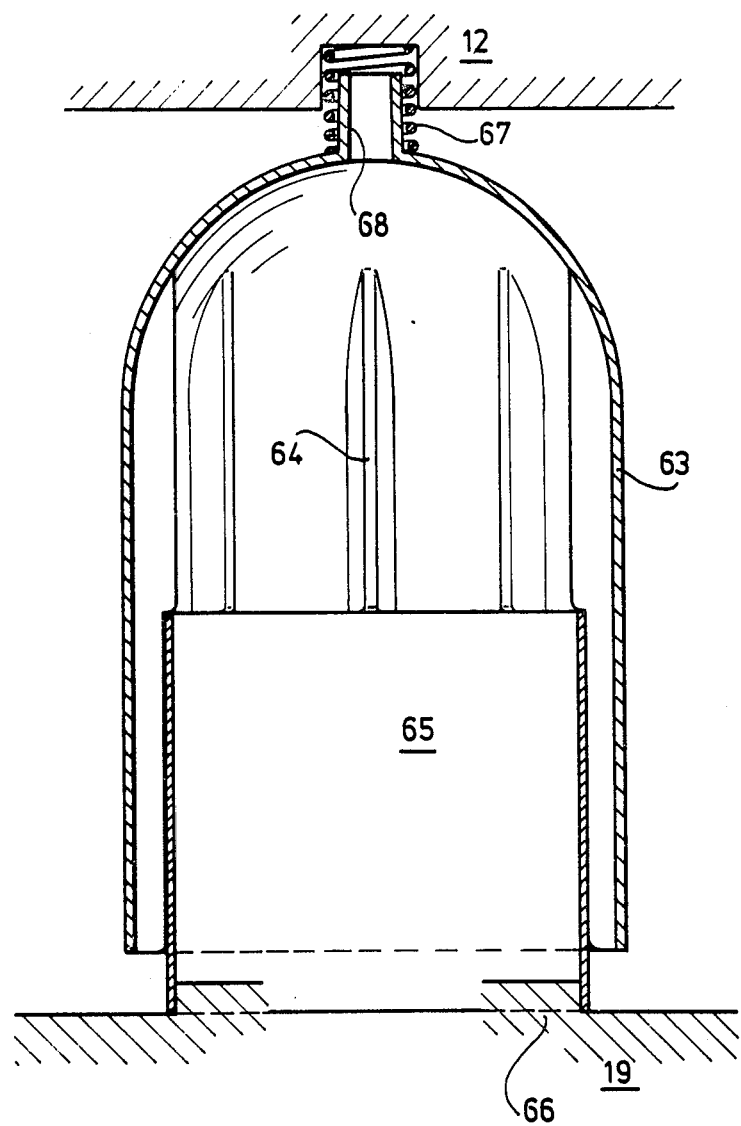
FIG. 4 is a partial sectional view of another embodiment of the dual sleeve assembly in accordance with the present invention which has been fabricated by injection molding.

A further embodiment of the invention is shown in FIG. 4. In FIG. 4, there is shown a different structure for the dual sleeve assembly 48 / 49 which forms the basis for the present invention. In the embodiment of FIG. 4, the baffle cupola and the outer sleeve of the dual sleeve assembly are formed integrally or as a single unitary part 63 which is preferably fabricated by injection molding. Ribs 64 are provided for stiffening and for centering an inner sleeve 65 of the dual sleeve assembly. The ribs 64 are provided on the outer sleeve 63 with a sliding seat and which is possibly also stiffened with ribs. As will be apparent from FIG. 4, the inner sleeve 65 is retained at an extension 66 molded to the base plate 19 and a single pressure spring 67 is provided about a stub 68 which is formed on the part 63 forming the one piece cupola and outer sleeve with the stub 68 defining therethrough an aperture similar to the aperture 55.

Figure 5:
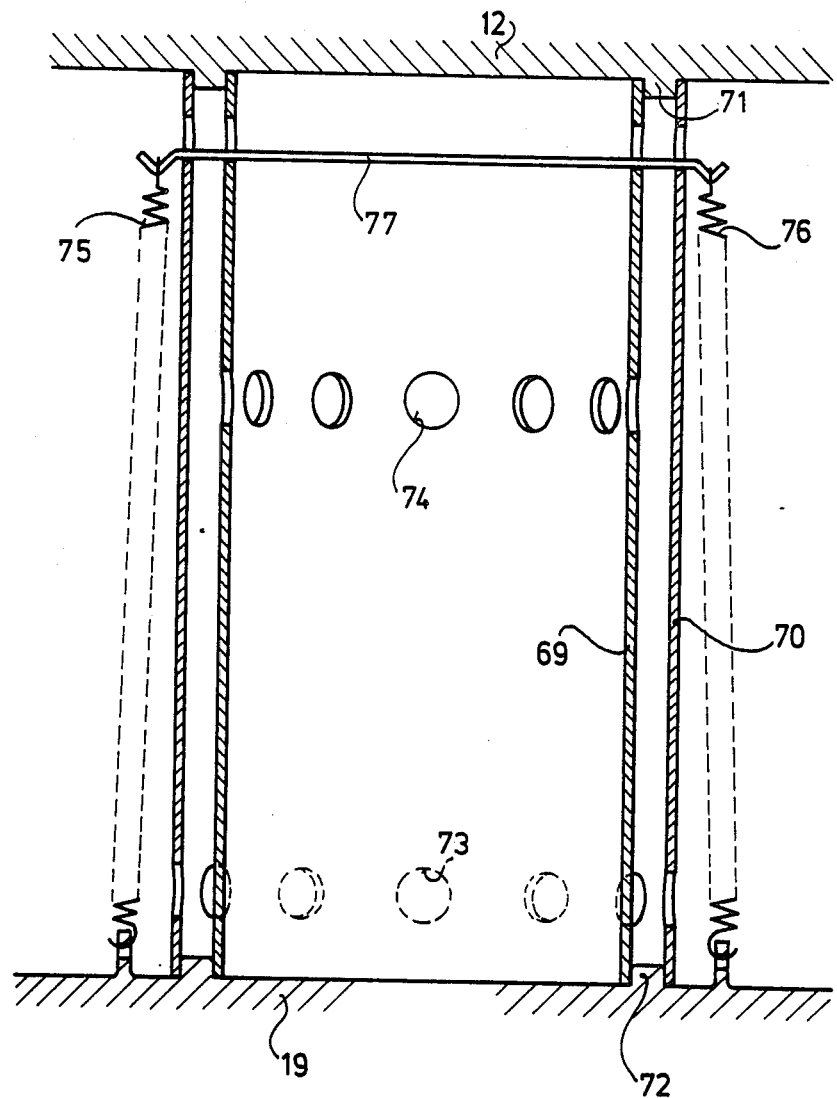
FIG. 5 is a partial sectional view of a further embodiment of the dual sleeve assembly of the invention.

A further embodiment of the invention is shown in FIG. 5, wherein the dual sleeve assembly is formed of two metallic sleeves 69 and 70 retained between the cover 12 and the base support plate 19. Ribs 71 and 72 respectively formed at the cover 12 and the base support 19 serve for centering of the sleeves 69 and 70. A row of holes 73 provided on the outer sleeve 70 in the vicinity of the base support plate and a row of holes 74 provided at a higher level on the inner sleeve 69 operate to guide flow of the fuel, while two tension springs 75 and 76 in cooperation with a web 77 operate as an assembly assistance. The web 77 penetrates through apertures which simultaneously serve as gas exit means, which apertures are provided in the two sleeves 69 and 70.

Thus, it will be seen that with the present invention, there is provided an arrangement for gas separation for the operational system of a diesel motor equipped with fuel consumption measurement means, which arrangement permits as long a flow travel as possible within a suitable tank 10 and a distribution of the gas containing fuel over as large an area as possible. Considered in more detail, it will be seen that the arrangement is constituted by a dual sleeve assembly including, for example, the sleeves 48 and 49 of which the inner sleeve 49 is in an essentially liquid sealing connection with the tank 10 at the base support plate 19 thereof, with the other or external sleeve 48 enabling a fluid connection 59 between the two sleeves 48 and 49 and being preferably closed off by a baffle cupola 52 facing the inflow aperture.

While specific embodiments of the invention have been shown and described in detail to illustrate the application of the inventive principles, it will be understood that the invention may be embodied otherwise without departing from such principles.

What is claimed is:

1. A gas separation valve assembly for the operational system of a diesel motor equipped for fuel comsumption measurement and including an injection pump comprising:

a tank having an outer wall and including an aperture for receiving excess fuel flowing back to said tank from said injection pump;

float means located within an interior space defined within said tank;

valve means responsive to said float means for controlling fluid flow through said interior space;

a duel sleeve assembly arranged essentially concentrically with a central axis of said tank surrounding said interior space, said sleeve assembly including an inner sleeve having a lower end in fluid-tight connection with said tank, and an outer sleeve arranged to define an annular space between itself and the outer wall of said tank and an intermediate space between itself and said inner sleeve;

a baffle cupola retained over an upper end of said outer sleeve;

said excess fuel receiving aperture being arranged to deliver fuel flowing therethrough onto said baffle cupola and therefrom into said annular space; and means effecting a lower fluid connection between said annular space and said intermediate space;

said duel sleeve assembly being configured to establish an upper fluid flow connection between said intermediate space and said interior space at an elevation higher than said lower fluid flow connection.

2. An assembly according to claim 1, wherein said inner sleeve and said outer sleeve are rigidly connected with each other.

3. An assembly according to claim 1, further comprising at least one pressure spring acting in the axial direction of said tank and arranged between a cover member of said tank and said baffle cupola.

4. An assembly according to claim 1, wherein said inner sleeve is shorter than said outer sleeve and wherein said upper fluid flow connection is provided by fluid within said annular space overflowing the top of said inner sleeve into said interior space.

5. An assembly according to claim 1, wherein said baffle cupola and said duel sleeve assembly are retained in position in said tank by a cover member of said tank.

6. An assembly according to claim 5, further comprising at least two supports fixed in said tank and passing through said intermediate space for centering said duel sleeve assembly in said tank, said cover being attached to said tank using said supports.

7. An assembly according to claim 6, further comprising at least one pressure spring acting in the axial direction of said tank and arranged between the cover member of said tank and said baffle cupola.

8. An assembly according to claim 5, further comprising at least one pressure spring acting in the axial direction of said tank and arranged between the cover member of said tank and said baffle cupola.

9. An assembly according to claim 1, wherein said baffle cupola and said outer sleeve are formed integrally as a single unitary member and wherein said inner sleeve is connected with said single unitary member by a plug-in connection.

10. An assembly according to claim 1, wherein said outer sleeve is provided with holes extending circumferentially thereabout at an approximately equivalent height and wherein said inner sleeve is provided with holes extending circumferentially thereabout at an approximately equivalent height, said holes in said inner sleeve being arranged at a location higher than said holes in said outer sleeve.

* * * * *